(12) United States Patent
Ni

(10) Patent No.: US 9,776,728 B2
(45) Date of Patent: Oct. 3, 2017

(54) DUAL-STAGE GEAR PUMP WITH REDUCED PRESSURE RIPPLE

(71) Applicant: Hamilton Sundstrand Corporation, Charlotte, NC (US)

(72) Inventor: Weishun William Ni, Rockton, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 440 days.

(21) Appl. No.: 14/337,924

(22) Filed: Jul. 22, 2014

(65) Prior Publication Data
US 2016/0023774 A1    Jan. 28, 2016

(51) Int. Cl.
| F04C 2/08 | (2006.01) |
| F04C 2/18 | (2006.01) |
| F04C 15/06 | (2006.01) |
| B64D 37/10 | (2006.01) |
| F02C 7/236 | (2006.01) |
| B64D 37/04 | (2006.01) |
| B64D 37/34 | (2006.01) |
| F04C 11/00 | (2006.01) |
| F04C 15/00 | (2006.01) |

(52) U.S. Cl.
CPC ............ *B64D 37/10* (2013.01); *B64D 37/04* (2013.01); *B64D 37/34* (2013.01); *F02C 7/236* (2013.01); *F04C 2/084* (2013.01); *F04C 2/18* (2013.01); *F04C 11/001* (2013.01); *F04C 15/0073* (2013.01); *F04C 15/0061* (2013.01); *F04C 2210/1044* (2013.01)

(58) Field of Classification Search
CPC ......... B64D 37/04; B64D 37/34; F04C 2/084; F04C 15/06; F04C 2250/101

USPC ....................... 418/71, 206.4, 191
See application file for complete search history.

(56) References Cited

U.S. PATENT DOCUMENTS

| 3,953,160 A | 4/1976 | Bottoms |
| 3,981,646 A | 9/1976 | Bottoms |
| 4,141,673 A | 2/1979 | McCormick |
| 4,505,124 A * | 3/1985 | Mayer .................. B64D 37/34 123/553 |

(Continued)

FOREIGN PATENT DOCUMENTS

EP    1722103 A2    11/2006

OTHER PUBLICATIONS

Extended European Search Report for European Application No. 15177836.2, dated Dec. 16, 2015, 6 pages.

*Primary Examiner* — Mark Laurenzi
*Assistant Examiner* — Anthony Ayala Delgado
(74) *Attorney, Agent, or Firm* — Kinney & Lange, P.A.

(57) ABSTRACT

A fuel system includes a fuel gathering system in fluid communication with a fuel storage container, and a fluid pump assembly in fluid communication with the fuel gathering system. The fluid pump assembly includes a main gear pump stage and a first flow attenuator. A main driven gear is meshed with a main drive gear in a main pump conduit, and a main pump bearing assembly rotatably supports the main drive gear and the main driven gear. The first flow attenuator is disposed around the main pump conduit, and includes a substantially polygonal fluid opening. Edges of the opening are substantially aligned with an undercut bearing portion on at least one of an inlet side and an outlet side of the main pump conduit to define a non-round fluid boundary.

16 Claims, 5 Drawing Sheets

(56) References Cited

U.S. PATENT DOCUMENTS

| | | |
|---|---|---|
| 4,512,722 A | 4/1985 | Mouton |
| 4,682,938 A | 7/1987 | Riordan |
| 5,118,258 A | 6/1992 | Martin |
| 5,863,189 A | 1/1999 | Sundberg et al. |
| 6,123,533 A | 9/2000 | McBurnett et al. |
| 7,497,083 B2 | 3/2009 | Yates et al. |
| 7,591,640 B2 | 9/2009 | Masuda et al. |
| 7,878,781 B2 | 2/2011 | Elder |
| 7,950,232 B2 | 5/2011 | Galozio et al. |
| 8,137,085 B2 | 3/2012 | Ni et al. |
| 2004/0228752 A1 | 11/2004 | Peters et al. |
| 2007/0178003 A1 | 8/2007 | Zhu et al. |
| 2010/0266437 A1 | 10/2010 | Martin-Dye |
| 2012/0141316 A1 | 6/2012 | Wakefield et al. |
| 2012/0219447 A1 | 8/2012 | Shah et al. |
| 2012/0219449 A1* | 8/2012 | Ni ............................ F04C 2/18 418/206.7 |
| 2013/0319153 A1 | 12/2013 | Ni |
| 2014/0023545 A1* | 1/2014 | Heitz ...................... F04C 2/086 418/191 |

* cited by examiner

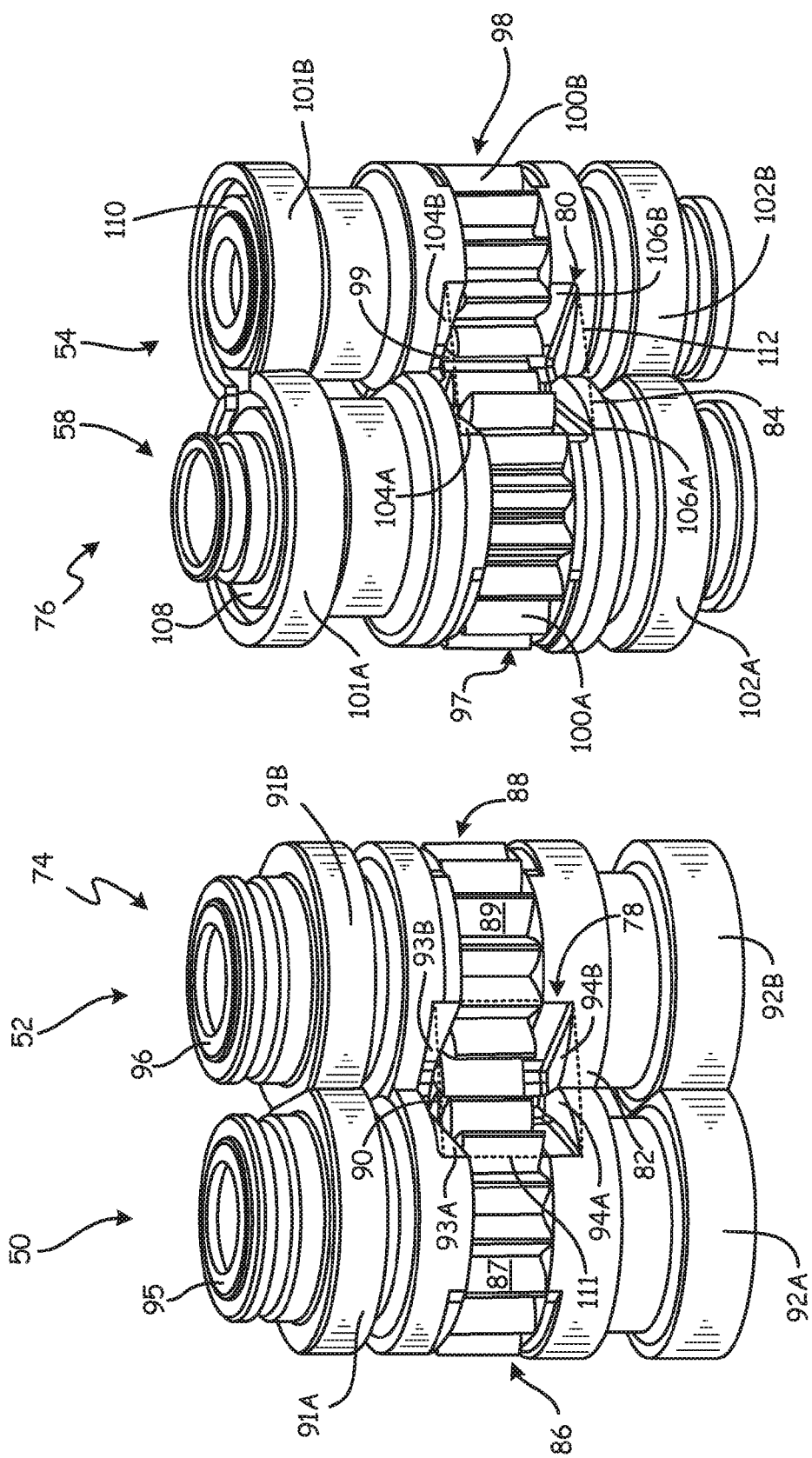

DUAL-STAGE GEAR PUMP WITH REDUCED PRESSURE RIPPLE

BACKGROUND

This disclosure relates generally to fluid pumps, and more specifically to gear pumps for pressurizing a fluid.

Though gear pumps are considered highly reliable, in some aircraft engine applications, incorrectly or inconsistently pressurized fuel or oil can seriously affect engine system performance and reduce component life. For example, fuel exiting a gear pump with high pressure ripple can cause cycling and hunting on the fuel metering valve, and if severe enough, pressure pulsation and cavitation can cause damage to the pump, piping or the engine itself.

Rotary and reciprocating fluid pumps, depending on their design, can induce pressure waves, pulses, cavitation, and/or erosion damage both upstream and downstream of the pump. Fuel pump pressure ripple can be caused by the frequency of rotating device like a gear pump. The gear pump teeth provide cyclic flow with internal gear pockets rotating from the inlet port toward the discharge port. The continuous output of each of these pocket flow cycles produces what appears to be sequence flow output with an amplitude and frequency.

SUMMARY

An embodiment of a fuel system includes a fuel gathering system in fluid communication with a fuel storage container, and a fluid pump assembly in fluid communication with the fuel gathering system. The fluid pump assembly includes a main gear pump stage and a first flow attenuator. A main driven gear is meshed with a main drive gear in a main pump conduit, and a main pump bearing assembly rotatably supports the main drive gear and the main driven gear. The first flow attenuator is disposed around the main pump conduit, and includes a substantially polygonal fluid opening. Edges of the opening are substantially aligned with an undercut bearing portion on at least one of an inlet side and an outlet side of the main pump conduit to define a non-round fluid boundary.

An embodiment of a fluid pump assembly includes a first gear pump stage, a second gear pump stage, a first pump bearing assembly, a second pump bearing assembly, a first flow attenuator, and a second flow attenuator. A first driven gear is meshed with a first drive gear in a first pump conduit, while a second driven gear is meshed with a second drive gear in a second pump conduit. The first pump bearing assembly rotatably supports the first drive gear and the first driven gear, while the second pump bearing assembly rotatably supports the second drive gear and the second driven gear. The first and second flow attenuators each include a pair of substantially polygonal fluid openings and a corresponding pair of undercut bearing portions disposed on at least one of an inlet side and an outlet side of the first and second pump conduits. The fluid openings have edges substantially aligned with the undercut bearing portions, defining first and second non-round fluid boundaries.

BRIEF DESCRIPTION OF THE DRAWINGS

FIG. 4A depicts a first stage of the dual-stage gear pump with undercut bearings disposed adjacent the gear mesh location.

FIG. 4B depicts an undercut bearing configuration and gear mesh location for a second stage of the dual-stage gear pump.

DETAILED DESCRIPTION

Figure 1:
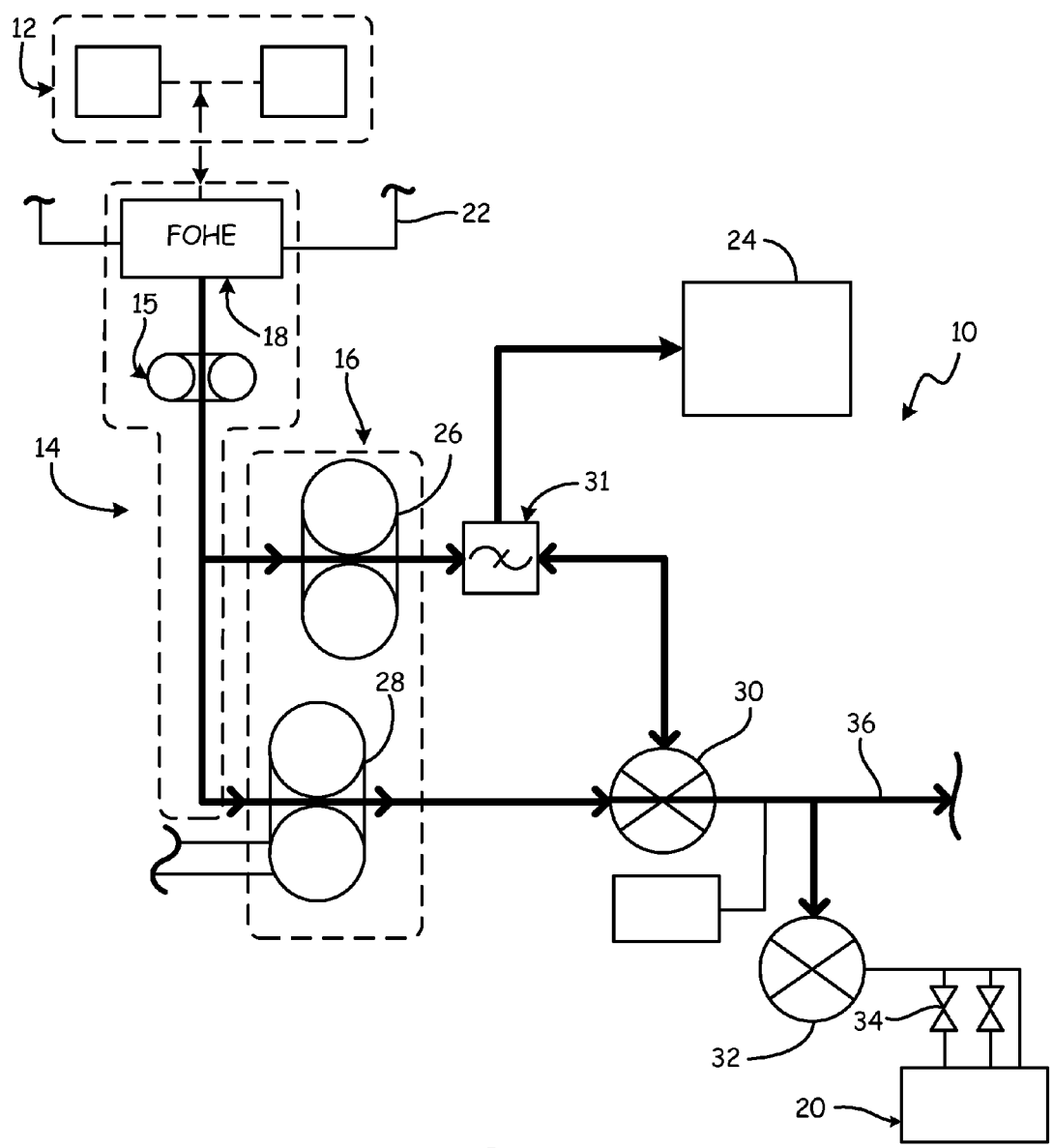
FIG. 1 is a block diagram showing a gas turbine fluid handling system including a dual-stage pump assembly.

FIG. 1 is a schematic representation of fluid handling system 10, which includes one or more fluid storage containers 12, fluid gathering system 14, and dual-stage fluid pump assembly 16. Generally, fluid gathering system 14 can include one or more pipes, boost pumps (e.g., low-pressure centrifugal boost pump 15), or other appurtenances in fluid communication with storage container(s) 12, while dual-stage fluid pump assembly 16 is in communication with, and can receive fluid from gathering system 14. Though described with respect to certain illustrative embodiments, it will be appreciated that fluid handling system 10 can be readily adapted (e.g., by adding, modifying, substituting, or omitting certain application-specific components) to other numerous applications including but not limited to gas turbine and/or transportation applications.

Fluid handling system 10 is described with respect to an illustrative, non-limiting embodiment of fuel system for one or more gas turbine engines installed on an aircraft. In this and other gas turbine applications, one or more heat exchangers 18 can also be incorporated into fuel system 10. In example embodiments for various aircraft, at least one of optional heat exchangers 18 can be a fuel-oil heat exchanger, while fluid storage container(s) 12 can include a plurality of wing-mounted fuel tanks. To preheat fuel prior to entering dual-stage fuel pump assembly 16 and (eventually) engine 20, heat exchanger 18 can be in selective thermal communication with engine oil 22 or other heated fluid flowing through an engine thermal management system (not shown). Though shown upstream of dual-stage fuel pump assembly 16, one or more heat exchangers 18 can additionally or alternatively be disposed downstream of dual-stage fuel pump assembly 16.

As seen in FIG. 1, dual-stage fuel pump assembly 16 includes first gear pump stage 26 and second gear pump stage 28. In certain applications such as aircraft fuel systems, first and second gear pump stages 26, 28 can operate in parallel so as to provide pressurized fuel for various engine-related applications. First gear pump stage 26 can include a pump selected from a servo fuel pump and a main fuel pump, while second gear pump stage 28 can include a pump selected from the other of the servo fuel pump and the main fuel pump. Here, with reference to the illustrative example of an aircraft engine fuel system, first gear pump stage 26 operates as a servo gear pump while second gear pump stage 28 operates as a main gear pump.

Under moderate to high power demand, a portion of the incoming fuel from fluid gathering system 14 can be diverted to first gear pump stage 26 while a second portion (up to and possibly including the remainder) goes to second gear pump stage 28. Fuel pressurized by first gear pump stage 26 can be delivered primarily to serve as a hydraulic actuation fluid for actuators 24, operating various mechanical accessories in and around engine 20. Excess pressurized fuel from first gear pump stage 26 can be merged with pressurized fuel from second gear pump stage 28 via one or more pump sharing valves 30. Fuel from one or both stages can be cleaned (filter unit 31), and the combined pressurized fuel can then be metered (valve 32) and delivered via fuel nozzles 34 for combustion, providing primary motive power for engine(s) 20. Excess preheated and/or pressurized fuel 36 can then be returned to fuel storage container 12 or otherwise recycled or reused to balance various system needs.

Dual-stage pump assembly 16 includes features which reduce or mitigate a number of these issues, while still retaining the high reliability of gear pumps. At least one of gear pump stages 26, 28 can include a flow attenuator and an undercut bearing portion, which are described in more detail with respect to subsequent figures.

Figure 2:
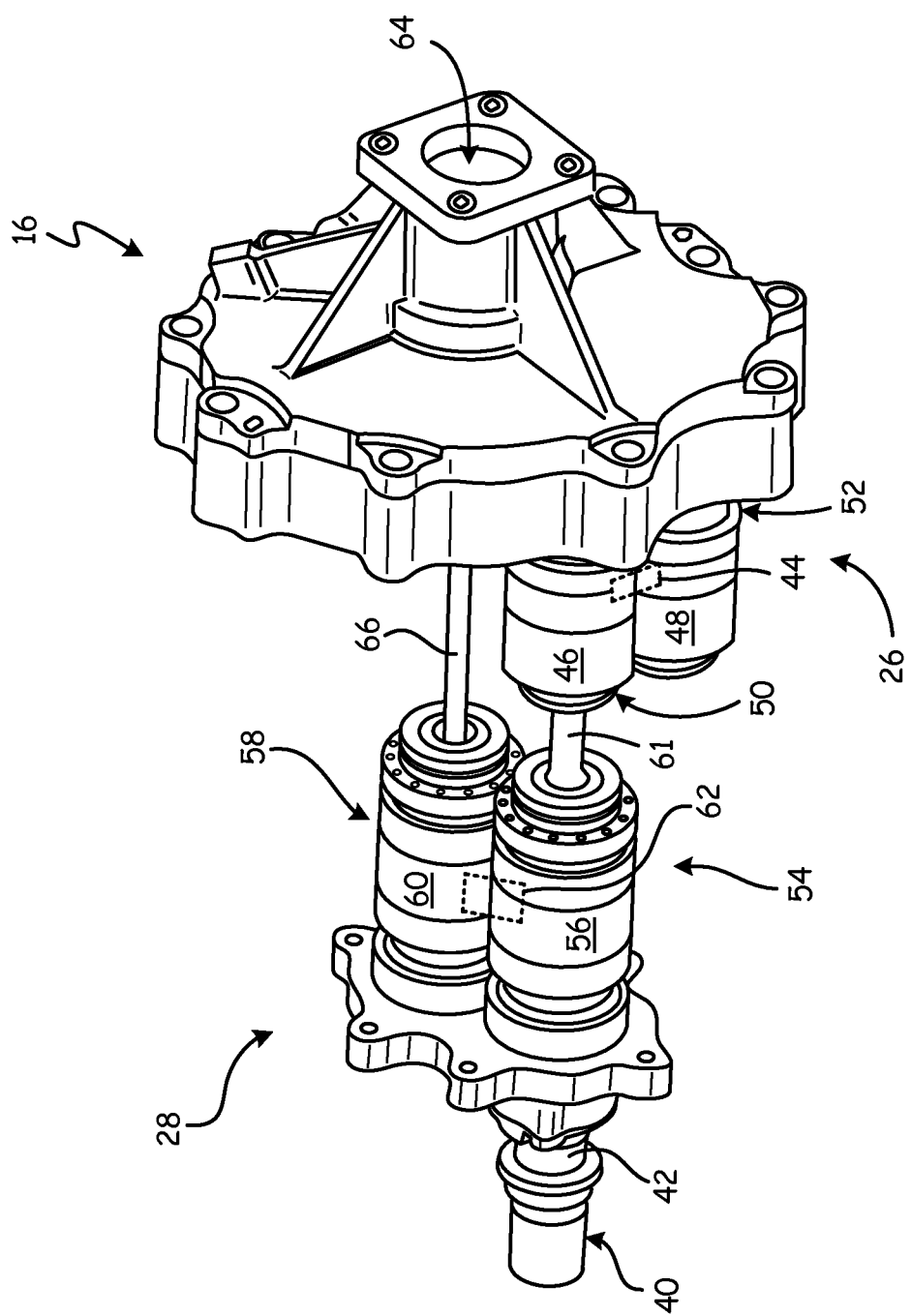
FIG. 2 schematically depicts an example dual-stage gear pump assembly and a corresponding flow configuration for the fluid handling system represented in FIG. 1.

FIG. 2 shows an example view of one type of dual-stage gear-driven fuel pump 16. As in FIG. 1, first/servo gear pump stage 26 and second/main gear pump stage 28 can be operated and driven in parallel by a single motor or motor unit. The motor unit can be any suitable electrically or mechanically operated device. Here, the motor can be a conventional single-phase or three-phase electrical motor with rotor portion 40 (accompanying stator omitted for clarity). Rotor portion 40 can be attached or connected to drive shaft 42, which is in turn rotatably connected to second gear pump stage 28. One or more additional shafts can rotatably drive first gear pump stage 26 via second gear pump stage 28, or independently thereof.

Here, fluid to be pressurized by first gear pump stage 26 (e.g., liquid fuel) enters a set of meshed gears (shown in FIG. 4A) proximate to first pump inlet location 44, but which are obscured by first drive side housing 46 and first driven side housing 48. One or more first drive gears (shown in FIG. 4A) are disposed in first drive side 50 (i.e., within first drive side housing 46). The first drive gears mesh with corresponding first driven gear(s) (also shown in FIG. 4A) internal to first driven side 52 (i.e., within first driven side housing 48).

FIG. 2 also shows second gear pump stage 28 with second drive side 54 and second driven side 56. Internal to second drive side 54 (i.e., within second drive side housing 56), one or more drive gears (shown in FIG. 4B) are rotatably coupled, either directly or indirectly, to drive shaft 42. The drive gear(s) are meshed with corresponding driven gear(s) (also shown in FIG. 4B) internal to second driven side 58. (i.e., within second driven side housing 60). Fluid to be pressurized by second gear pump stage 28 (here, also liquid fuel), enters the main set of meshed gears proximate main pump inlet location 62. The actual inlet is obscured in FIG. 2 by housings 56, 60.

In certain embodiments, first drive gear(s) can be rotatably coupled, directly or indirectly, to coupling shaft 61. Main coupling shaft assembly 61 can include one or more coupling shafts connected to internal drive shafts (not shown in FIG. 2), and can rotatably connect the first drive gear and/or drive shaft with the second drive gear and/or drive shaft so that rotation of main coupling shaft assembly 61 allows simultaneously operation of both first gear pump stage 26 and second gear pump stage 28.

In certain embodiments, excess motive power from dual-stage pump assembly 16 can also drive other accessories. In this example, fuel can first enter low-pressure port 64 disposed on first gear pump stage 26, then enter low-pressure boost pump 15 (shown in FIG. 1), which can be driven by supplemental shaft 66 rotatably coupled to second driven side 48.

Figure 3:
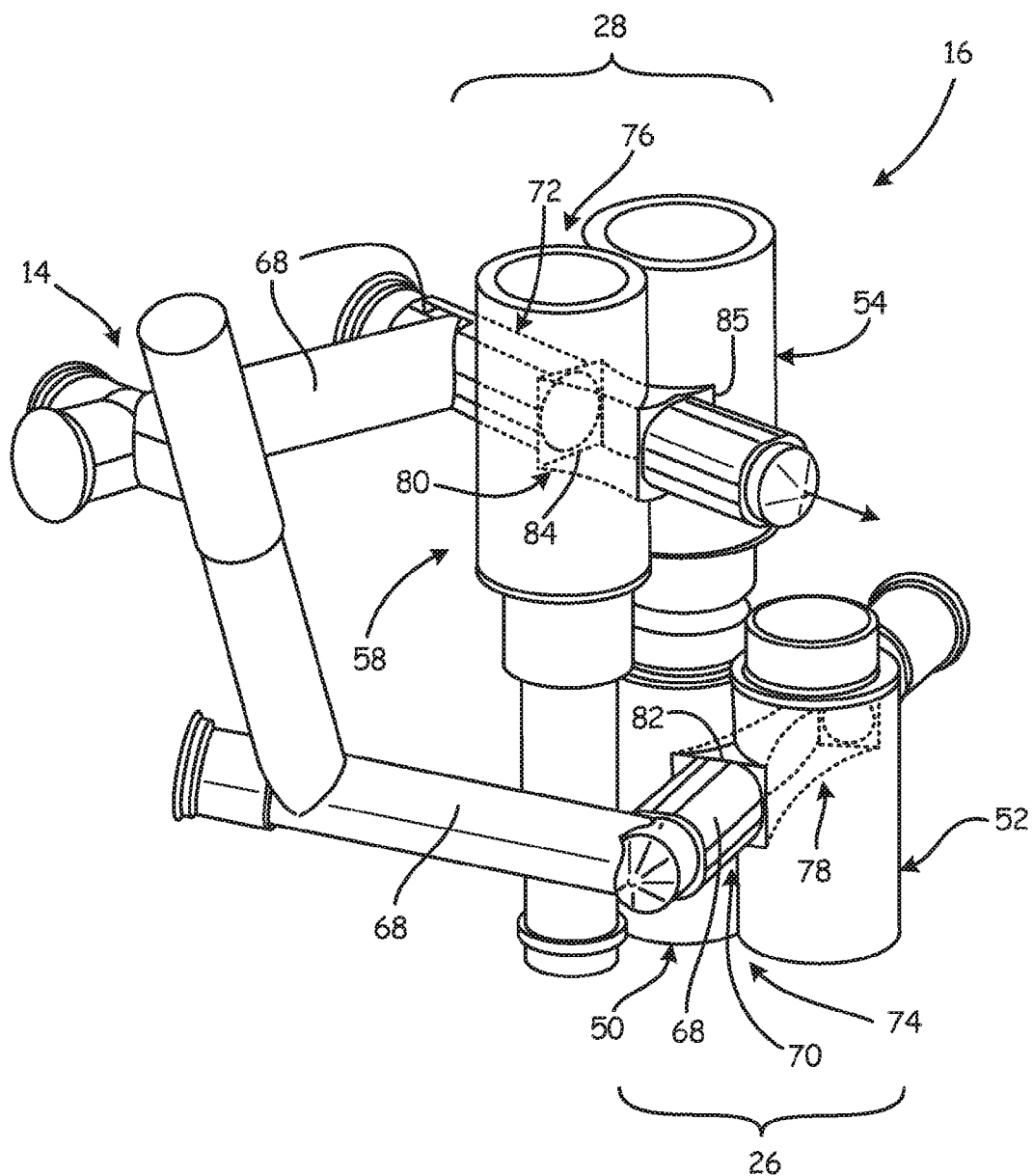
FIG. 3 is a side view of an example dual-stage gear pump.

FIG. 3 schematically depicts one example flow configuration of dual-stage pump assembly 16 adapted to receive fluid from gathering system 14. Some features have been omitted for purposes of clarity, including but not limited to housings 44, 46, 56, and 60 (seen in FIG. 2).

Dual-stage pump assembly 16 can receive a fluid such as fuel (e.g., Jet A-1 or other suitable liquid fuel) through a number of feed lines 68. First and second gear pump stages 26, 28 include respective first and second inlet ports 70, 72 in fluid communication with fuel gathering system 14 (via one or more feed lines 68). Inlet ports 70, 72 lead incoming fluid to be pressurized by rotation of the corresponding sets of meshed gears (shown in FIGS. 4A-5B). As best seen in FIGS. 4A and 4B, the meshed gears can be mounted to corresponding drive or driven shafts, which are in turn supported by first and second bearing assemblies 74, 76.

Conventional gear pumps, as well as certain other rotary or reciprocating pumps, induce a characteristic pressure profile in fluid exiting the pump. This pressure profile can be propagated as fluid moves throughout the system and can particularly affect the performance and/or life of sensitive downstream components. In gas turbine applications, a large effective amplitude of fluid pulses can cause fatigue and failure in downstream engine components receiving the pressurized fluid. At best, significant fluid pressure pulses or ripple from a conventional gear pump can result in imprecise fuel metering, as the fuel metering valves depend on a relatively constant feed pressure. In more pronounced cases, significant resonance of fluid pulses can rapidly damage fuel piping downstream of the gear pump. This pressure ripple (in frequency and/or amplitude) will cause engine performance loss and damage. And when a fluid pressurized by a conventional gear pump is to be used as a hydraulic actuation fluid, it can result in unnecessary vibration, noise, cavitation, and fatigue in the hydraulically actuated device(s).

To help reduce or mitigate issues of fluid pulsing one or both gear pump stages 26, 28 can include first and second flow attenuators 78, 80. First and second flow attenuators 78, 80 are adapted so as to reduce eddy and turbulence in the incoming fluid, while reflecting, and thus canceling remaining portions of the pressure ripple back to the gear pocket as the flow exits the respective pump stage (best seen in FIGS. 5A and 5B).

In certain embodiments, first and second flow attenuators 78, 80 each include substantially polygonal fluid openings 82, 84. Inlet side of polygonal fluid opening 82 and outlet side of polygonal opening 84 are obscured in FIG. 3 by bearing assemblies 74, 76. However, in this particular illustrative example, it will be understood that polygonal fluid openings 82, 84 on either side bearing assemblies 74, 76 can have four substantially right-angled walls or edges forming a rectangular or square flow boundary. As seen in FIGS. 4A and 4B, polygonal fluid opening 84 is of a similar shape as opening 82, as well as fluid outlet 85 which can also form a part of flow attenuator 80. Intersections of adjacent walls can form right angles, or can alternatively have one or more rounded corners to form polygonal fluid openings 82, 84. However, it will be appreciated that polygonal configurations other than substantially rectangular or square walls and edges are also appropriate depending on a particular flow pattern. As shown in more detail in FIGS. 4A-4B, edges of one or both polygonal fluid openings 82, 84 can be aligned with a corresponding undercut bearing portion to provide a non-round fluid boundary on an inlet side of the respective gear pump stage 26, 28.

FIGS. 4A and 4B respectively show detailed views of first and second bearing assemblies 74, 76. Each of first and second bearing assemblies 74, 76 includes two stationary bearings and two floating bearings. A drive gear or driven gear, depending on the configuration, is mounted axially between a stationary bearing and a floating bearing. One pair of journal bearings can be stationary bearings, while the other pair can be pressure loaded floating bearings, capable of axial movement within their respective housings (shown in FIG. 2). In this example, first drive gear 86 is mounted to first drive shaft 95, while first driven gear 88 is mounted to first driven shaft 96. Similarly, in FIG. 4B, second driven gear 98 meshes with second drive gear 97 to define a second plurality of gear mesh pockets 99 between teeth 100A, 100B.

In FIG. 4A, first driven gear 88 (with gear teeth 89) meshes with first drive gear 86 (with gear teeth 87) to define a first plurality of gear mesh pockets 90. First bearing assembly 74 rotatably supports both first drive gear 86 and first driven gear 88 via floating journal bearings 91A, 91B and stationary journal bearings 92A, 92B.

FIG. 4A also shows an inlet portion of first attenuator 78, namely floating bearing undercuts 93A, 93B and stationary bearing undercuts 94A, 94B. These undercuts, located proximate to a meshing location of gears 86, 88, generally align with the substantially polygonal shape of first fluid openings 82 (shown in FIG. 4A as a dashed line).

Second bearing assembly 76 rotatably supports both second drive gear 97 and second driven gear 98 via second stationary journal bearings 101A, 101B and second floating journal bearings 102A, 102B. FIG. 4B also shows another inlet portion of second inlet attenuator 80, namely stationary bearing undercuts 104A, 104B and floating bearing undercuts 106A, 106B. These undercuts generally align with the substantially polygonal shape of second fluid openings 84 (shown in FIG. 4B as a dashed line). This is proximate to the meshing location of gears 97, 98. In this example, second drive gear 97 is mounted to second drive shaft 108, while second driven gear 98 is mounted to first driven shaft 110.

With respect to both FIGS. 4A and 4B, edges of the respective polygonal fluid opening are aligned with the corresponding undercut bearing portion to provide a non-round fluid boundary 111, 112 on an inlet side of each respective gear pump stage. This is one such configuration of an attenuator which reduces and mitigates the effects of pressure ripple otherwise caused by conventional gear pumps.

Figure 5A:
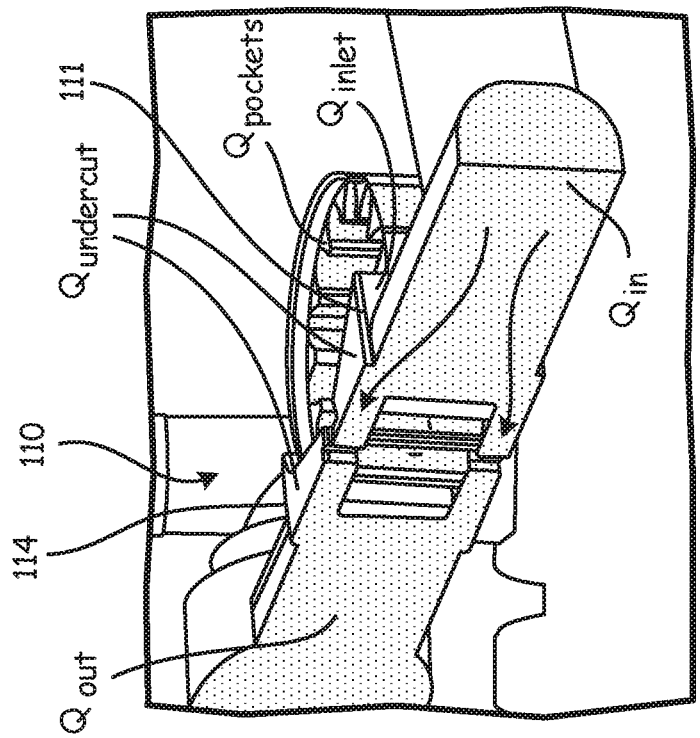
FIG. 5A is a first sectional view of flow through a first stage of the gear pump with undercut bearings disposed adjacent the gear mesh.
Figure 5B:
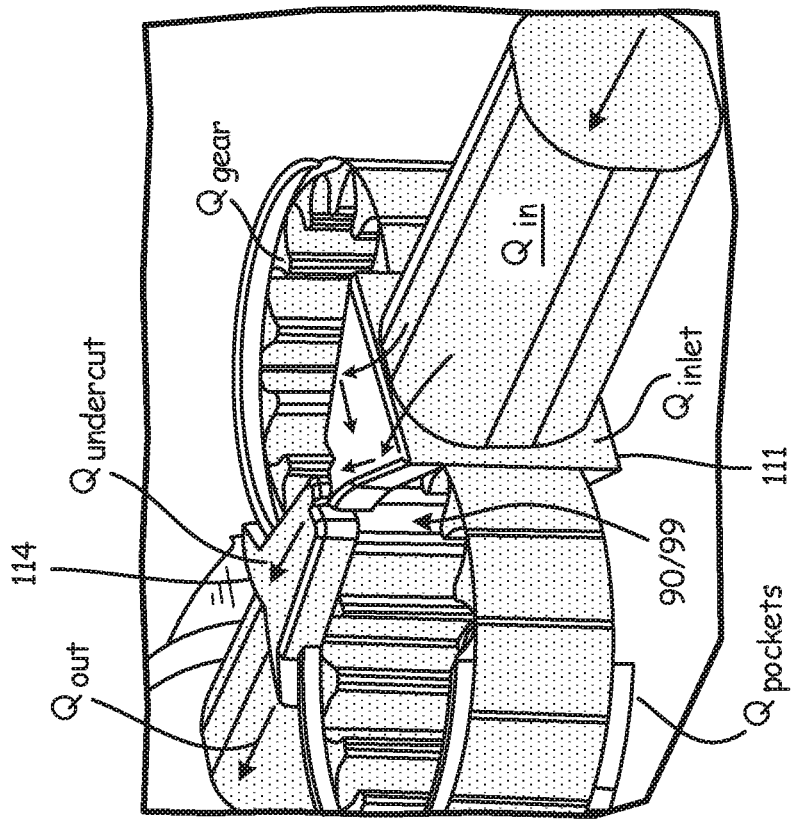
FIG. 5B is a second sectional view of the dual-stage fuel pump and undercut bearings disposed adjacent the gear mesh.

FIGS. 5A and 5B show a simulated flow path through one of the pump stages having an attenuator disposed proximate to the meshing location of the drive and driven gears. A confluence of inlet attenuator, the meshed gears, and the bearing walls define a corresponding first or second (i.e., servo or main) pump conduit with a nonround fluid boundary 111. Various flows Q through the conduit, as well as around the drive and driven gears, are represented by stippled surfaces. Here, flow toward the inlet side of the attenuator is denoted as $Q_{in}$ and the pressurized flow around the outlet side of the attenuator is denoted $Q_{out}$.

As fluid enters the attenuator, typically from round piping, $Q_{in}$ expands to the edges of the polygonal opening and becomes $Q_{inlet}$. Some of this flow expands outwardly to counteract pulses from gear pocket flow ($Q_{pocket}$) converging from either side. At the same time, some of $Q_{inlet}$ flow, by way of the bearing undercuts is free to travel over or under mesh pockets 90/99. This flow $Q_{undercut}$ also destructively interferes with the converging and diverging fluid pulses of $Q_{pocket}$ as the fluid transitions to $Q_{out}$ at polygonal nonround fluid boundary 114, and into high-pressure piping 110.

In certain embodiments, the first and/or second pump conduit has a flow transition length equal to about an odd multiple of gear teeth. This reduces pressure ripple sufficiently to damp flow turbulence in the fuel system, leading to improved fuel metering, component life, and engine performance.

Discussion of Possible Embodiments

The following are non-exclusive descriptions of possible embodiments of the present invention.

A fuel system includes a fuel gathering system in fluid communication with a fuel storage container, and a fluid pump assembly in fluid communication with the fuel gathering system. The fluid pump assembly includes a main gear pump stage and a first flow attenuator. A main driven gear is meshed with a main drive gear in a main pump conduit, and a main pump bearing assembly rotatably supports the main drive gear and the main driven gear. The first flow attenuator is disposed around the main pump conduit, and includes a substantially polygonal fluid opening. Edges of the opening are substantially aligned with an undercut bearing portion on at least one of an inlet side and an outlet side of the main pump conduit to define a non-round fluid boundary.

The fuel system of the preceding paragraph can optionally include, additionally and/or alternatively, any one or more of the following features, configurations and/or additional components:

A fuel system according to an exemplary embodiment of this disclosure, among other possible things includes a fuel storage container, a fuel gathering system in fluid communication with the fuel storage container, and a fluid pump assembly in fluid communication with the fuel gathering system, the fluid pump assembly including a main gear pump stage including a main driven gear meshed with a main drive gear in a main pump conduit, a main pump bearing assembly rotatably supporting the main drive gear and the main driven gear, and a first flow attenuator disposed around the main pump conduit, the first flow attenuator including a substantially polygonal fluid opening having edges substantially aligned with an undercut bearing portion on at least one of an inlet side and an outlet side of the main pump conduit to define a non-round fluid boundary.

A further embodiment of the foregoing fuel system, wherein additionally or alternatively, the fuel storage container comprises a plurality of wing-mounted fuel tanks.

A further embodiment of any of the foregoing fuel systems, wherein additionally or alternatively, the fuel system further comprises a heat exchanger disposed upstream of the dual-stage fuel pump assembly, wherein the heat exchanger is in selective thermal communication with engine oil flowing through an engine thermal management system.

A further embodiment of any of the foregoing fuel systems, wherein additionally or alternatively, the fluid pump assembly is a dual-stage fuel pump assembly and further comprises a servo gear pump stage including a servo driven gear meshed with a servo drive gear in a servo pump conduit, and a servo pump bearing assembly rotatably supporting the servo drive gear and the servo driven gear.

A further embodiment of any of the foregoing fuel systems, wherein additionally or alternatively, the dual-stage fuel pump assembly further comprises: a second flow attenuator disposed around the main pump conduit, the second flow attenuator including a substantially polygonal fluid opening having edges substantially aligned with an undercut bearing portion on at least one of an inlet side and an outlet side of the servo pump conduit to define a non-round fluid boundary.

A further embodiment of any of the foregoing fuel systems, wherein additionally or alternatively, the servo gear pump stage and the main gear pump stage are configured in parallel.

A further embodiment of any of the foregoing fuel systems, wherein additionally or alternatively, the fuel system further comprises a gear shaft assembly rotatably connecting the servo drive gear and the main drive gear, wherein rotation of the gear shaft assembly simultaneously operates both the servo gear pump stage and the main gear pump stage.

A further embodiment of any of the foregoing fuel systems, wherein additionally or alternatively, the main pump conduit has a flow transition length equal to about an odd multiple of gear teeth.

An embodiment of a fluid pump assembly includes a first gear pump stage, a second gear pump stage, a first pump bearing assembly, a second pump bearing assembly, a first flow attenuator, and a second flow attenuator. A first driven gear is meshed with a first drive gear in a first pump conduit, while a second driven gear is meshed with a second drive gear in a second pump conduit. The first pump bearing assembly rotatably supports the first drive gear and the first driven gear, while the second pump bearing assembly rotatably supports the second drive gear and the second driven gear. The first and second flow attenuators, disposed around the first and second pump conduits, each include a pair of substantially polygonal fluid openings and a corresponding pair of undercut bearing portions disposed on at least one of an inlet side and an outlet side of the first and second pump conduits. Edges of the fluid openings have edges substantially aligned with the undercut bearing portions, defining first and second non-round fluid boundaries.

The fluid pump assembly of the preceding paragraph can optionally include, additionally and/or alternatively, any one or more of the following features, configurations and/or additional components:

A fluid pump assembly according to an exemplary embodiment of this disclosure, among other possible things includes a first gear pump stage including a first driven gear meshed with a first drive gear in a first pump conduit; a second gear pump stage including a second driven gear meshed with a second drive gear in a second pump conduit; a first pump bearing assembly rotatably supporting the first drive gear and the first driven gear; a second pump bearing assembly rotatably supporting the second drive gear and the second driven gear; a first flow attenuator disposed around the first pump conduit, the first flow attenuator including a pair of substantially polygonal fluid openings having edges substantially aligned with a corresponding pair of undercut bearing portions disposed on at least one of an inlet side and an outlet side of the first pump conduit, and defining a first non-round fluid boundary; and a second flow attenuator disposed around the second pump conduit, the second flow attenuator including a pair of substantially polygonal fluid openings having edges substantially aligned with a corresponding pair of undercut bearing portions disposed on at least one of an inlet side and an outlet side of the second pump conduit, and defining a second non-round fluid boundary.

A further embodiment of the foregoing fluid pump assembly, wherein additionally or alternatively, the fluid pump assembly further comprises a gear shaft assembly rotatably connecting the first drive gear and the second drive gear.

A further embodiment of any of the foregoing fluid pump assemblies, wherein additionally or alternatively, the first and second gear pump stages are configured in parallel.

A further embodiment of any of the foregoing fluid pump assemblies, wherein additionally or alternatively, the first gear pump stage comprises a pump selected from a servo fuel pump and a main fuel pump; and the second gear pump stage comprises a pump selected from the other of the servo fuel pump and the main fuel pump.

A further embodiment of any of the foregoing fluid pump assemblies, wherein additionally or alternatively, the first drive gear is mounted to a first drive shaft; the first driven gear is mounted to a first drive shaft; the second drive gear is mounted to a second drive shaft; and the second driven gear is mounted to a second driven shaft.

A further embodiment of any of the foregoing fluid pump assemblies, wherein additionally or alternatively, the first bearing assembly comprises: a first stationary journal bearing supporting a first axial end of the first drive shaft; a first pressure-loaded journal bearing supporting a second axial end of the first drive shaft; a second stationary journal bearing supporting a first axial end of the first driven shaft; and a second pressure-loaded journal bearing supporting a second axial end of the first driven shaft.

A further embodiment of any of the foregoing fluid pump assemblies, wherein additionally or alternatively, at least one of the first and second pump conduits has a flow transition length equal to about an odd multiple of gear teeth.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system comprising:
   a fuel storage container;
   a fuel gathering system in fluid communication with the fuel storage container; and
   a fluid pump assembly in fluid communication with the fuel gathering system, the fluid pump assembly comprising:
      a main gear pump stage including a main driven gear meshed with a main drive gear in a main pump conduit, and a main pump bearing assembly rotatably supporting the main drive gear and the main driven gear; and
      a first flow attenuator disposed around the main pump conduit, the first flow attenuator including a fluid opening on each of an inlet side and an outlet side of the main pump conduit, each fluid opening having rounded corners between elongated edges to define substantially polygonal non-round fluid boundaries, including the elongated edges substantially aligned with an undercut bearing portion on each of the inlet side and the outlet side;
      wherein the substantially polygonal non-round fluid boundaries and undercut bearing portions define a flowpath through the main pump conduit for expanding an incoming fluid to edges of the substantially polygonal opening on the inlet side, a first portion of the incoming fluid expanding outwardly to counteract pulses from converging gear pocket flows, and a second portion of the incoming fluid expanding outwardly, by way of the bearing undercuts, for traveling over or under meshing gear pockets.

2. The fuel system of claim 1, wherein the fuel storage container comprises:
a plurality of wing-mounted fuel tanks.

3. The fuel system of claim 1, wherein the fluid pump assembly is a dual-stage fuel pump assembly and further comprises:
a servo gear pump stage including a servo driven gear meshed with a servo drive gear in a servo pump conduit, and a servo pump bearing assembly rotatably supporting the servo drive gear and the servo driven gear.

4. The fuel system of claim 1, wherein the dual-stage fuel pump assembly further comprises:
a second flow attenuator disposed around the servo pump conduit, the second flow attenuator including a fluid opening on each of an inlet side and an outlet side of the servo pump conduit, each fluid opening having rounded corners between elongated edges to define substantially polygonal, non-round fluid boundaries, including the elongated edges substantially aligned with an undercut bearing portion on each of the inlet side and the outlet side.

5. The fuel system of claim 4, wherein the servo gear pump stage and the main gear pump stage are configured in parallel.

6. The fuel system of claim 4, further comprising:
a gear shaft assembly rotatably connecting the servo drive gear and the main drive gear;
wherein rotation of the gear shaft assembly simultaneously operates both the servo gear pump stage and the main gear pump stage.

7. The fuel system of claim 1, wherein the main pump conduit has a flow transition length equal to a total length of an odd multiple of gear teeth.

8. A fluid pump assembly comprising:
a first gear pump stage including a first driven gear meshed with a first drive gear in a first pump conduit;
a second gear pump stage including a second driven gear meshed with a second drive gear in a second pump conduit;
a first pump bearing assembly rotatably supporting the first drive gear and the first driven gear;
a second pump bearing assembly rotatably supporting the second drive gear and the second driven gear;
a first flow attenuator disposed around the first pump conduit, the first flow attenuator including a fluid opening on each of an inlet side and an outlet side of the first pump conduit, each fluid opening having rounded corners between elongated edges and defining substantially polygonal first non-round fluid boundaries, including the elongated edges substantially aligned with an undercut bearing portion on each of the inlet side and the outlet side; and
a second flow attenuator disposed around the second pump conduit, the second flow attenuator including a fluid opening on each of an inlet side and an outlet side of the second pump conduit, each fluid opening having rounded corners between elongated edges and defining substantially polygonal second non-round fluid boundaries, including the elongated edges substantially aligned with an undercut bearing portion on each of the inlet side and the outlet side;
wherein the substantially polygonal non-round fluid boundaries and undercut bearing portions of the first flow attenuator define a flowpath through the first pump conduit for expanding an incoming fluid to edges of the substantially polygonal opening on the inlet side, a first portion of the incoming fluid expanding outwardly to counteract pulses from converging gear pocket flows, and a second portion of the incoming fluid expanding outwardly, by way of the bearing undercuts, for traveling over or under meshing gear pockets.

9. The fluid pump assembly of claim 8, further comprising:
a gear shaft assembly rotatably connecting the first drive gear and the second drive gear.

10. The fluid pump assembly of claim 8, wherein the first and second gear pump stages are configured in parallel.

11. The fluid pump assembly of claim 8, wherein:
the first gear pump stage comprises a pump selected from a servo fuel pump and a main fuel pump; and
the second gear pump stage comprises a pump selected from the other of the servo fuel pump and the main fuel pump.

12. The fluid pump assembly of claim 8, wherein:
the first drive gear is mounted to a first drive shaft;
the first driven gear is mounted to a first drive shaft;
the second drive gear is mounted to a second drive shaft; and
the second driven gear is mounted to a second driven shaft.

13. The fluid pump assembly of claim 12, wherein the first bearing assembly comprises:
a first stationary journal bearing supporting a first axial end of the first drive shaft;
a first pressure-loaded journal bearing supporting a second axial end of the first drive shaft;
a second stationary journal bearing supporting a first axial end of the first driven shaft; and
a second pressure-loaded journal bearing supporting a second axial end of the first driven shaft.

14. The fluid pump assembly of claim 8, wherein at least one of the first and second pump conduits has a flow transition length equal to a total length of an odd multiple of gear teeth.

15. The fuel system of claim 4, wherein the substantially polygonal non-round fluid boundaries and undercut bearing portions define a flowpath through the servo pump conduit for expanding an incoming fluid to edges of the substantially polygonal opening on the inlet side, a first portion of the incoming fluid expanding outwardly to counteract pulses from converging gear pocket flows, and a second portion of the incoming fluid expanding outwardly, by way of the bearing undercuts, for traveling over or under meshing gear pockets.

16. The fluid pump assembly of claim 8, wherein the substantially polygonal non-round fluid boundaries and undercut bearing portions of the second flow attenuator define a flowpath through the second pump conduit for expanding an incoming fluid to edges of the substantially polygonal opening on the inlet side, a first portion of the incoming fluid expanding outwardly to counteract pulses from converging gear pocket flows, and a second portion of the incoming fluid expanding outwardly, by way of the bearing undercuts, for traveling over or under meshing gear pockets.

* * * * *